May 22, 1934.   M. VOGEL-JORGENSEN   1,959,451
COOLING MEANS FOR BEARINGS
Filed March 5, 1932
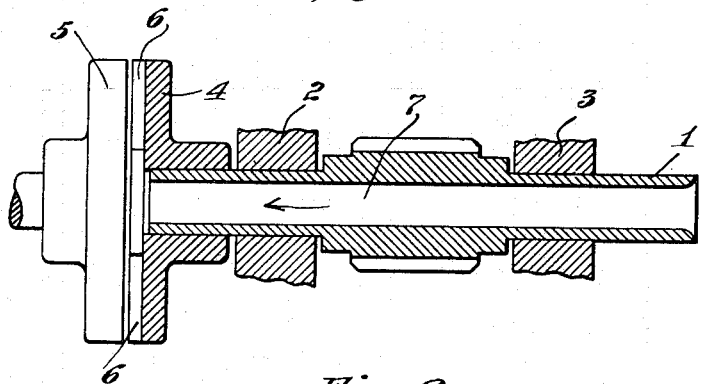
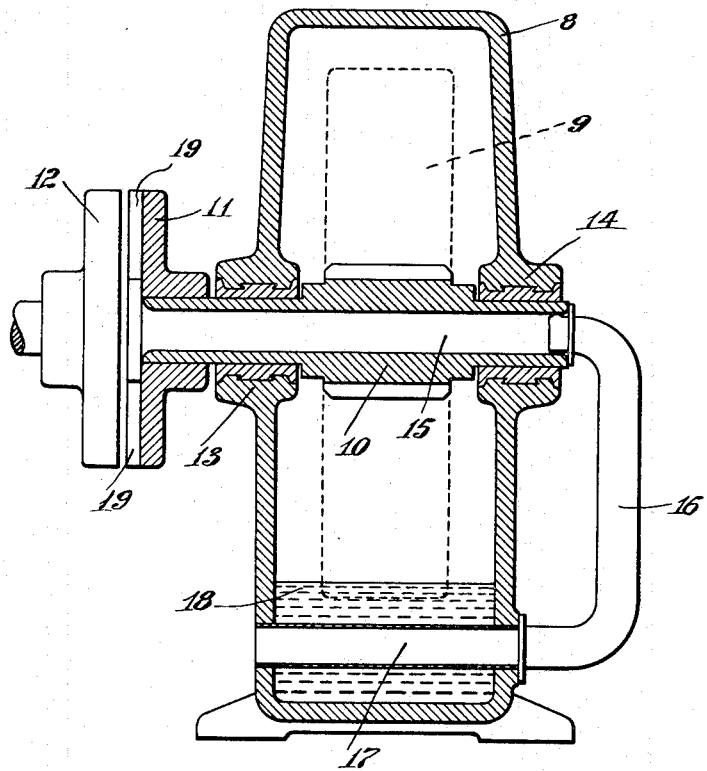
INVENTOR.
Mikael Vogel-Jorgensen
BY
Redding, Greeley, Shea & Campbell
ATTORNEYS.

Patented May 22, 1934

1,959,451

UNITED STATES PATENT OFFICE 1,959,451

COOLING MEANS FOR BEARINGS

Mikael Vogel-Jorgensen, Copenhagen, Denmark, assignor to F. L. Smidth & Co., New York, N. Y., a corporation of New Jersey Application March 5, 1932, Serial No. 596,983
In France December 4, 1931

1 Claim.  (Cl. 308—76)

This invention relates to the cooling of rotating machine elements and their bearings.

Various devices have been suggested for this purpose previously, such as the provision of hollow shafts through which air is caused to pass as from a cowl outside a building to which the hollow shaft is connected or under the influence of a fan connected to the shaft. In some cases the air has been caused to move through the shaft by the action of pistons in cylinders to which the shafts are connected or by hoods at opposite ends of the shafts.

According to the present invention a hollow shaft or a coupling between a tubular shaft and a shaft to which the tubular shaft is adapted to be coupled is made to carry vanes or blades which act as a fan to draw or force air through the hollow shaft. The longitudinal bore of the tubular shaft is preferably connected with the space in which the vanes or blades are located at a point where there is a differential pressure relative to the surrounding atmosphere. The bore of the shaft may be connected to a cooler placed in an oil sump or chamber in which may be located the bearing of the shaft or gearing connected to the shaft.

The invention will now be described with reference to the accompanying drawing, wherein:

Figure 1 is a view in longitudinal sectional elevation of a tubular shaft and its bearing and coupling provided with the invention.

Figure 2 is a similar view with a housing about the bearing of the shaft to form a chamber or oil sump, with a cooler connected with the bore of the shaft, a gear being indicated by broken lines within the housing.

In Figure 1 a tubular pinion shaft 1 is shown as mounted in bearings 2 and 3, which may be of any suitable kind. On the shaft is keyed a coupling member 4, a cooperating coupling member 5 being keyed to the driving shaft. The shaft or one of the coupling members, as 4, is made to carry vanes or blades 6, which may be formed in any suitable manner, and the bore 7 of the shaft communicates with the space in which the vanes or blades revolve at a point of pressure differential, that is, at a point where the pressure is such as to cause air to move forward through the bore of the shaft. In the rotation of the shaft 1 a powerful air current is drawn through the bore 7 of the shaft and thus an effective cooling of the shaft, its bearings and the pinion on the shaft is obtained.

In Figure 2 a gear 9 is shown as mounted within a housing 8. The gear may engage a pinion on the tubular shaft 10. A coupling member 11 may be keyed to the shaft 10 and a cooperating coupling member 12 may be keyed to the driving shaft. Suitable bearings 13, 14, may be provided for the shaft 10. As in the structure shown in Figure 1, the shaft or one of the coupling members is provided with vanes or blades 19 and the bore 15 of the shaft 10 communicates with the space in which the vanes or blades revolve at a point of pressure differential. As will be understood, the greatest heat development occurs in the bearings of the pinion shaft 10, whereas the heat development of the bearings of a gear engaged with the pinion as shown is considerably less. To provide for the effective cooling of the oil provided for lubrication of the gears the bore 15 of the shaft 10 is connected by a tube 16 to one end of the bore of a tubular cooler 17 mounted in the oil sump or chamber 18 formed by the housing about the gearing and communicating with the atmosphere at the other end. The gear wheel 9 is immersed in oil, and the gear wheel and its bearings are lubricated by the so-called "splash lubrication". Air is drawn through the hollow shaft by means of the vanes or blades 19 carried by the shaft or coupling member 11, and thereby an efficient cooling of the oil as well as of the entire structure is obtained.

I claim as my invention:

The combination of a tubular shaft, vanes or blades carried by the shaft, the bore of the shaft communicating with the space in which the vanes or blades revolve at a point of pressure differential, a housing forming a chamber about the shaft and an oil sump, a tubular cooler within the oil sump and connected to the atmosphere, and a connection between the other end of the bore of the cooler and the bore of the shaft, whereby cooling air is caused to move through the cooler and the shaft and the oil in the shaft is cooled.

MIKAEL VOGEL-JORGENSEN.